(12) United States Patent
Wellman et al.

(10) Patent No.: US 6,997,719 B2
(45) Date of Patent: Feb. 14, 2006

(54) TRAINING MODEL FOR ENDOSCOPIC VESSEL HARVESTING

(75) Inventors: Parris S. Wellman, Hillsborough, NJ (US); William McJames, Belle Meade, NJ (US); Daniel Gordon, Newtown, PA (US)

(73) Assignee: Ethicon, Inc., Somerville, NJ (US)

( * ) Notice: Subject to any disclaimer, the term of this patent is extended or adjusted under 35 U.S.C. 154(b) by 493 days.

(21) Appl. No.: 10/183,270

(22) Filed: Jun. 27, 2002

(65) Prior Publication Data

US 2004/0002045 A1    Jan. 1, 2004

Related U.S. Application Data

(60) Provisional application No. 60/391,858, filed on Jun. 26, 2002.

(51) Int. Cl.
*G09B 23/28* (2006.01)
(52) U.S. Cl. .................................... 434/272
(58) Field of Classification Search ............... 434/262, 434/267, 268, 272
See application file for complete search history.

(56) References Cited

U.S. PATENT DOCUMENTS

| | | | | |
|---|---|---|---|---|
| 4,481,001 A | * | 11/1984 | Graham et al. | 434/267 |
| 4,789,340 A | * | 12/1988 | Zikria | 434/272 |
| 5,149,270 A | * | 9/1992 | McKeown | 434/262 |
| 5,945,056 A | * | 8/1999 | Day et al. | 264/250 |
| 5,951,301 A | * | 9/1999 | Younker | 434/272 |
| 5,967,790 A | * | 10/1999 | Strover et al. | 434/274 |
| 6,077,221 A | * | 6/2000 | Fowler, Jr. | 600/233 |
| 6,234,804 B1 | * | 5/2001 | Yong | 434/267 |
| 6,488,507 B1 | * | 12/2002 | Stoloff et al. | 434/272 |
| 6,780,016 B1 | * | 8/2004 | Toly | 434/262 |

* cited by examiner

*Primary Examiner*—Kurt Fernstrom

(57) ABSTRACT

A leg model, designed to teach endoscopic saphenous vein harvesting, is provided that accurately models the anatomy of the saphenous vein in the human thigh, and closely approximates the subcutaneous tissues in a human. The subcutaneous tissue is formulated and manufactured such that the saphenous vein adheres to the subcutaneous tissue to simulate the adhesion in a human leg. The model includes a reusable base and a replaceable single use insert. The base is size and configured to receive the insert. The tray can include a slit located at a point along its length that permits the ends of the tray to rotate about the slit so that the ends can be bent with respect to one another.

11 Claims, 3 Drawing Sheets

TRAINING MODEL FOR ENDOSCOPIC VESSEL HARVESTING

This application claims the benefit of Provisional Application No. 60/391,858, filed Jun. 26, 2002.

FIELD OF THE INVENTION

The present invention relates generally to a training model for endoscopic vessel harvesting and a method of using and manufacturing the training model.

BACKGROUND OF THE INVENTION

One of the most common types of heart surgery is coronary artery bypass grafting, or CABG. In CABG, a blockage in one or more coronary arteries is bypassed by connecting a graft vessel to the coronary artery downstream of the blockage. The technique of connecting the graft vessel to the coronary artery is known as anastomosis. The graft vessel may be a mammary artery dissected from the chest wall, where the upstream end of the artery is left intact and the downstream end is attached to the coronary artery. Alternatively, the graft vessel may be a section of artery or vein from elsewhere in the patient's body, or an artificial vascular graft, where the upstream end of the graft is attached to an artery such as the aorta, and the downstream end is connected to the coronary artery downstream of the blockage.

Where more than one bypass is required, the graft vessel most commonly used is the great saphenous vein. The great saphenous vein, referred to hereinafter as the saphenous vein, is the longest vein in the body. It begins on the medial side of the foot, rises to extend up along the inner side of the leg, and penetrates deep into the thigh just below the inguinal ligament in the lower abdomen, where it joins the femoral vein. Near its distant end, the saphenous vein receives vessels that drain the upper thigh, groin, and lower abdominal wall. Due to its length, once harvested, doctors can cut the saphenous vein into multiple grafts, and then use each graft to "jump" a blockage in a different coronary artery by attaching a proximal end of the graft to an artery that supplies oxygenated blood and the distal end of the graft to the coronary artery downstream of the blockage.

In recent years, there have been great strides in the harvesting of veins using less-invasive techniques. The technique has evolved from an open "fillet" procedure, where the surgeon cuts down through the tissue overlying the saphenous vein to harvest the vein, to less-invasive procedures, where the surgeon harvest the vein by using an endoscopic device passed through one or more small incisions. Examples of these techniques are described in U.S. Pat. Nos. 5,928,138 and 6,193,653, which are hereby incorporated by reference. The small incisions of the less-invasive techniques heal more readily, with fewer complications and far less pain, than the open procedures.

To perform the less-invasive techniques, however, the surgeon, physician's assistant or registered nurse first assistant needs to master an endoscopic procedure, which requires training before the surgeon becomes proficient. The surgeon gains experience by performing the endoscopic procedure on pigs, cadavers or on models. In any case, the procedures performed on an animal or on a cadaver or prior art models do not accurately reflect the clinical conditions. Pig anatomy is not the same as the human anatomy, and the cadaver tissue does not simulate live tissue. Further, while commercially available prior art models from, for example, Limbs 'n Things (www.limbsandthings.com) and the Chamberlain Group (www.thecgroup.com), provide models having veins that contain simulated blood, the models do not provide realistic training for dissection of the vein from the surrounding tissue using endoscopic tools. These products are often designed such that the housing, which is often formed to take the appearance of a human leg, and the tissue that surrounds the vein is reusable. In these cases, the vein casting is designed to be replaceable, which means that the vein casting must be relatively easily removable from the material that surrounds the vein casting. As a result, the veins of these models are disposed in relatively loose material, such as polyester batting. Thus, the dissection or separation of the saphenous vein from the surrounding tissue is much easier with the models as compared with the real procedure.

SUMMARY OF THE INVENTION

The present invention provides a training model for endoscopic vessel harvesting that more realistically simulates vessel dissection, side branch ligation and vessel harvesting, and a method of using and manufacturing the training model.

More particularly, the invention is a leg model, designed to teach endoscopic saphenous vein harvesting, that accurately models the anatomy of the saphenous vein in the human thigh, and closely approximates the subcutaneous tissues in a human. The saphenous vein includes anatomical features like branching, anterior branches and a multitude of side branches. The subcutaneous tissue is formulated and manufactured such that the saphenous vein adheres to the subcutaneous tissue to simulate the adhesion in a human leg.

The model includes a reusable base and a replaceable single use insert. The base is size and configured to receive the insert. The insert includes a tray, a tissue material disposed within the space defined by the tray, and a vein casting disposed within the tissue material. The tissue material is comprised of a material having qualities that simulate subcutaneous tissue. The tray can also include a slit located at a point along its length that permits the ends of the tray to rotate about the slit so that the ends can be bent at an angle with respect to one another.

The base may include an upper surface that configures the insert ends at a defined angle when the insert is nested within the base. Preferably, the angle is designed to place the ends of the insert such that they reflect the angle formed by the thigh and lower leg when a human leg is placed in a splayed position to better expose the tissue overlying the saphenous veins.

A novel method of manufacturing the endoscopic vein harvesting model is also disclosed.

A further understanding of the nature and advantages of the invention and further aspects and advantages of the invention may be realized by reference to the remaining portion of the specification and the drawings, which are not drawn to scale.

DETAILED DESCRIPTION OF THE SPECIFIC EMBODIMENTS

Figure 1:
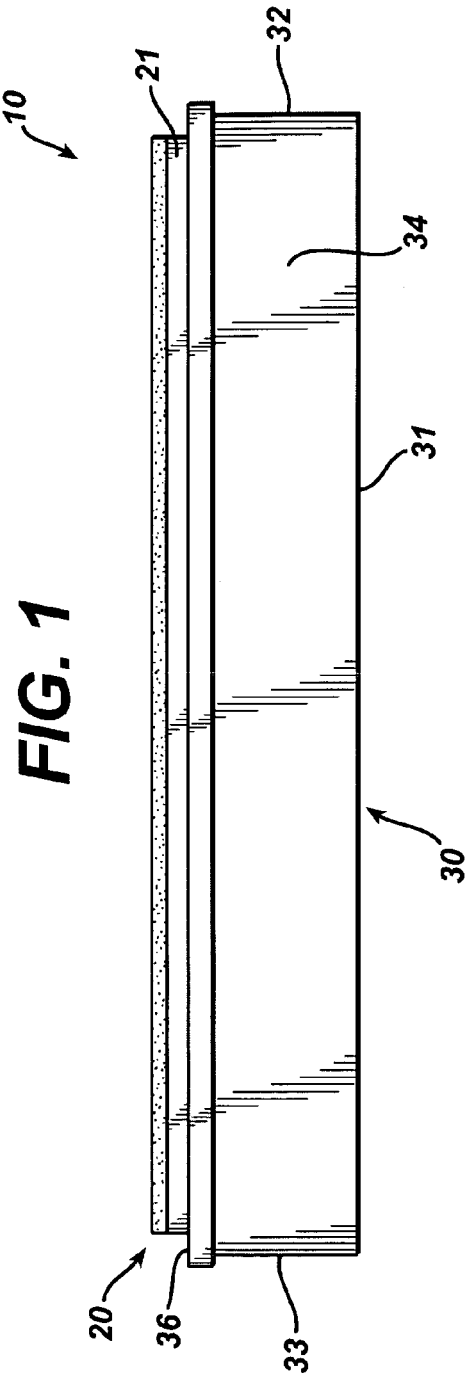
FIG. 1 is a side view of a training model according to the invention, including a first embodiment of a base and an insert.
Figure 2:
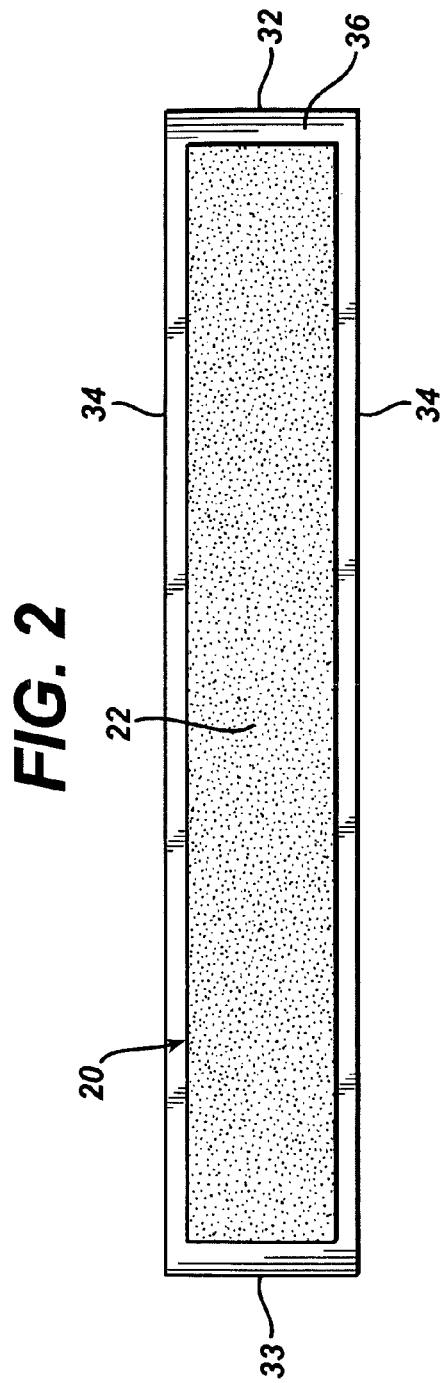
FIG. 2 is a top plan view of the training model according to the invention with a partial cut-away.

Referring to FIGS. 1 and 2, the model, shown generally as reference numeral 10, includes a reusable base 30 and a replaceable single use insert 20. Base 30 includes a bottom 31, and a front wall 32, a back wall 33, and two side walls 34 extending upwardly therefrom. Base 30 also includes an upper surface 36, which extends from bottom wall 31, front wall 32 and side walls 34 around the perimeter of base 30. Base 30 is size and configured to receive insert 20.

Figure 3:
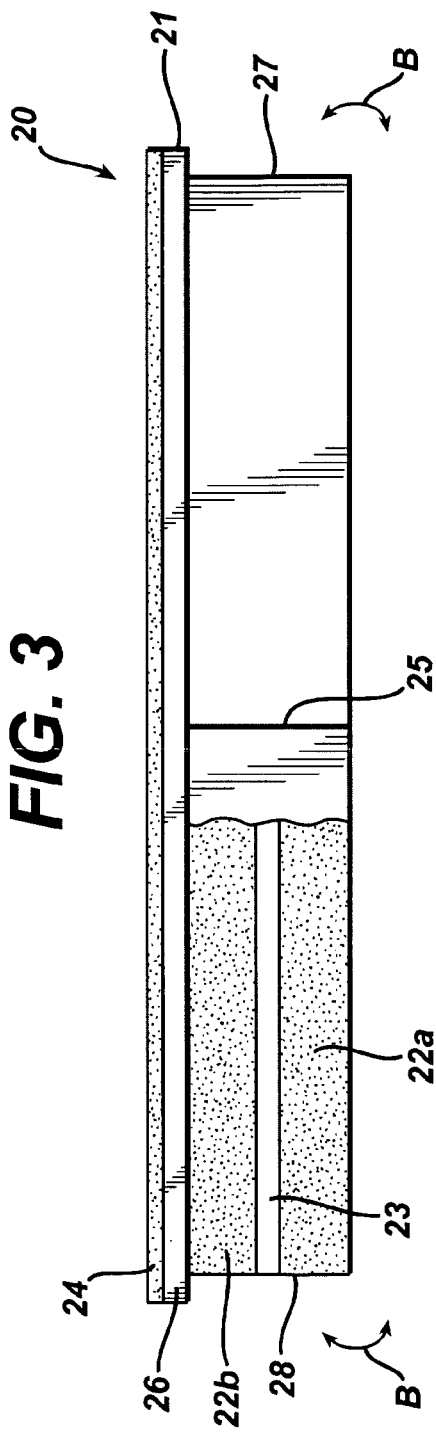
FIG. 3 is a side view of an insert of the training model of FIG. 1.
Figure 4:
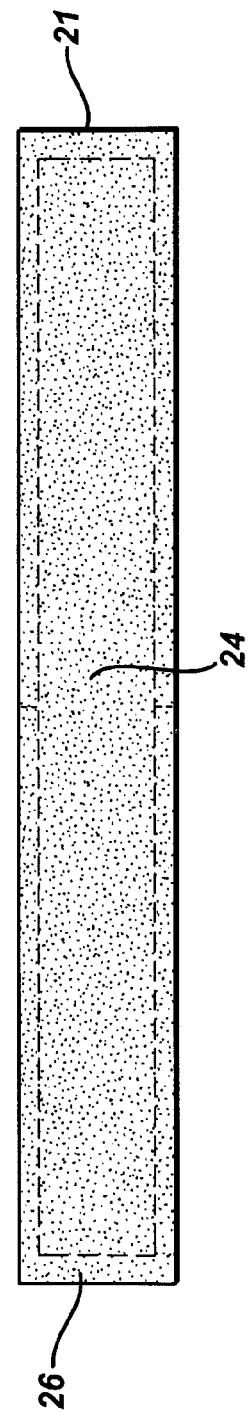
FIG. 4 is a top plan view of an insert of the training model of FIG. 1.

Referring to FIGS. 3 and 4, insert 20 includes a tray 21, a tissue material 22 disposed within the space defined by tray 21, and a vein casting 23 disposed within tissue material 22. Tray 21 may also include a lip 26 that extends around the outer perimeter of tray 21, and a first end 27 and a second end 28. Tray 21 is sized and configured to be received within base 30 as is shown in FIG. 1. Preferably, lip 26 rests on upper surface 36 of base 30 when tray 20 is nested within the interior defined by the walls of base 30. Tissue material 22 is comprised of a material having qualities that simulate subcutaneous tissue. Tissue material 22 can be comprised of two layers, a first layer 22a that underlies vein casting 23, and a second layer 22b that overlies vein casting 23. Overlying second layer 22b is a top layer 24 that simulates cutaneous tissue and also serves to seal tissue material 22 and vein casting 23 within tray 21. Top layer 24 can be formed of a second type of elastomer, but is preferably latex or polyurethane, and is preferably glued to lip 26 about the perimeter of tray 21. Tissue material 22 is formed of an elastomer, preferably castable urethane rubber, polydimethyl siloxane, or silicone of various grades, most preferably GE RTV 6166. One skilled in the art will recognize that tissue material 22 is chosen to closely resemble mechanical properties that are qualitatively similar to human subcutaneous tissue.

Tray 21 can also include a slit 25 located at a point along its length. Slit 25 creates an opening in the bottom wall, side walls and lip 26 of tray 21 so as to permit ends 27, 28 of tray 21 to rotate about slit 25 in the directions indicated by arrow B. In a rotated position, top layer 24 stretches so as to retain a connection between ends 27, 28.

Figure 5:
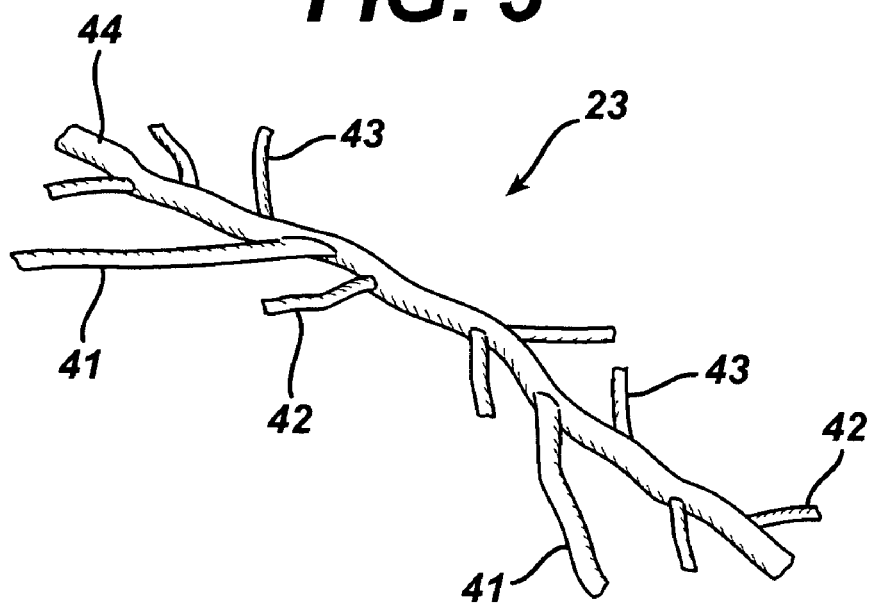
FIG. 5 is a schematic of the saphenous vein casting.

Referring to FIG. 5, vein casting 23 includes a saphenous vein 44, bifurcations 41, and side branches 42. Preferably vein casting 23 includes from ten to twenty side branches 42, at least two of which 43 are on the anterior surface. Tissue material 22 surrounds vein casting 23 as is shown schematically in FIG. 3. It is understood, however, that vein casting 23 does not occupy a specified layer of insert 20, as it is composed of bifurcations 41 and numerous side branches 42 that extend in different directions from the irregularly formed trunk of the saphenous vein 44. Vein casting 23 is composed of a material that has a harder durometer than tissue material 22, and is preferably a polymer such as silicone, most preferably Dow Corning HSII silicone.

In a preferred embodiment of the training model, tissue material 22 (which represents the adipose tissue) is preferably cast so that it is slightly adheres to vein casting 23, making for realistic dissection. The strength of this adhesion was measured using a perpendicular peel force test. In experimental testing, the overlying simulated skin and tissue were dissected away using a scalpel until the vessel was exposed to the midline of its diameter. All side branches were transected, and the vessel was segmented into 1 inch long sections. A single loop of 1-0 prolene suture was tied around the center of the vessel, and the other end was tied to a Mark 10 Model M610 force transducer with a 10 pound range and 0.01 pound resolution. The force transducer was pulled directly up and the peak pull of force was measured at 0.13+/−0.01 pounds. In the most preferred case, the pull-out force ranges from approximately 0.10 to 0.20 pounds/inch of vessel adhered. It is contemplated, however, that the adhesion force could be varied between 0.05 pounds/inch and 0.5 pounds/inch to simulate varying degrees of difficulty in vessel dissection.

Figure 6:
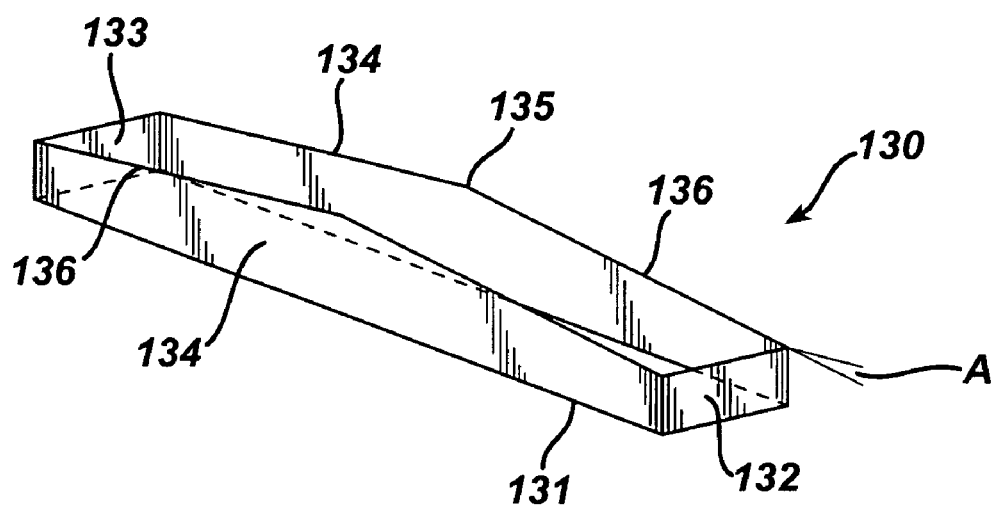
FIG. 6 is a second embodiment of a base in accordance with the invention.

Referring to FIG. 6, a second embodiment of a base 130 in accordance with the invention is depicted. Base 130 includes a bottom 131, and a front wall 132, a back wall 133, and two side walls 134 extending upwardly therefrom. Side walls 134 have upper surfaces 136 that angle upwardly from back wall 133 and front wall 132 to form a bend 135. The angle A formed by bend 135 is between 2 and 20 degrees when measured from a plane parallel to the bottom 131, and is most preferably about 5 degrees. Angle A is designed to reflect the angle formed by a human leg as it is positioned when it is prepared for dissection in the operating room. In this position, the legs are placed in a splayed position to better expose the tissue overlying the saphenous veins. In addition, the angle of the model directs a portion of the dissection force applied by the user downward. This in turn increases the normal force between the model base and the surface upon which it rests, which increases its ability to resist sliding forces because the amount of frictional force increases. It is understood by those skilled in the art that base 30 may be configured in a number of ways such that, once insert 20 contacts base 30, insert 20 is bent at an angle that approximates the position a splayed leg would take during a vessel harvesting procedure. For example, base 30 could include a cross strut that is adjustable to different heights above base 30 such that the angle formed by the ends of insert 20 depends on how high the cross strut is positioned above base 30. In this case, ends of insert 20 and that portion of insert 20 that underlies slit 25 would contact base 30, and insert 20 would not necessarily need to be partially disposed within base 30.

A method of manufacturing the endoscopic vein harvesting model will now be described. To manufacture an insert 20, first vein casting 32 is cast by pouring a polymer such as silicone, and preferably Dow Corning HSII silicone into a mold. The mold preferably includes bifurcations, anterior branches and side branches. Next, pour castable room-temperature-vulcanizable silicone into a mold, such as tray 21, to form first subcutaneous layer 22a that underlies vein casting 23. Then, place vein casting 23 in contact with first layer 22a while first layer 22a remains uncured and apply tension to vein casting 23 to properly position the vein 23 within first layer 22a. Finally, pour castable room temperature vulcanizable silicone rubber into tray 21 to form second tissue layer 22b that overlies vein casting 23. Inserting the vein into the uncured rubber ensures that there is at least some adhesion between the "fatty tissue" and the vein, thus providing more realistic dissection. The first and second layers may be castable urethane rubber or silicone of various grades, but preferably GE RTV 6166. To remove any gas that may be dissolved within the layers, the insert may be degassed by placing the insert in a vacuum chamber or by agitating the insert prior to a time when the first and second layers take a set. In addition, the cure time can be decreased by increasing the temperature of the model.

Slit 25 may be formed in tray 21 by cutting tray 21 to permit ends 27, 28 of tray 21 to rotate about slit 25 to from an angle. Insert 20 is then placed in base 130, which as described above, dictates the angle taken by insert 20, and is designed to accept insert 20 in a nesting fashion. Upper surface 136 of the base forms an angle such that, when tray 21 is nested within base 130, tray 21 assumes an angle A that simulates a human leg in a splayed position. The surgeon then may simulate a vein harvest procedure by utilizing endoscopic instruments to pierce the cutaneous layer 24 and dissect the subcutaneous layer tissue material 22 down to vein casting 23. At this stage the user can then dissect vein casting 23 away from subcutaneous layer 22 and ligate side branches of vein casting 23 in a manner similar to the real-life procedure.

To use model 10 for training, the surgeon locates model 10 in a setting designed to approximate the atmosphere of an operating room. The surgeon makes an incision over the center of the model and locates the vein using standard open dissection techniques. Appropriate endoscopic instruments, for example instruments from the ClearGlide Vessel Harvesting Kit (Cardiovations), are used to perform the remainder of the dissection, including transecting side branches. Once the training session is complete, the insert can be removed from the base and replaced with a new insert for subsequent training sessions.

While the above is a complete description of the preferred embodiments of the invention, it will be appreciated that various equivalents, modifications, additions and substitutions may be made without departing from the scope thereof. Therefore, the above should not be taken as limiting the scope of the invention, which is defined by the following claims.

Furthermore, the invention provides various independent aspects and is not limited to a single indispensable feature, advantage or aspect. Thus, each feature or aspect of the invention may be considered independent of the other features, advantages and aspects of the present invention.

What is claimed is:

1. A training model for endoscopic vein harvesting, comprising:
    a reusable base; and
    a disposable insert sized and configured to be at least partly disposed within the reusable base, the insert comprising:
        a tray;
        a tissue material disposed within the tray, the tissue material comprising a material having qualities that simulate subcutaneous tissue; and
        a vein casting disposed within the material.

2. The training model of claim 1, wherein the fray includes a lip and the base includes an upper surface, and the lip of the tray contacts the upper surface of the base when the tray is at least partly disposed within the base.

3. The training model of claim 1, wherein the tray includes a first end and a second end and has a slit located at a point along the length of the tray.

4. The training model of claim 3, wherein the slit permits the first end and the second end to rotate with respect to the slit.

5. The training model of claim 4, wherein the base includes an upper surface configured to cause the first end and the second end to rotate with respect to the slit when the tray is disposed at least partly within the base.

6. The training model of claim 1, wherein the vein casting is disposed within the tissue material such that a pull-out force between the tissue material and the vein casting ranges from 0.05 to 0.50 lbs/inch.

7. The training model of claim 6, wherein the pull-out force between the tissue material and the vein casting ranges from 0.10 to 0.20 lbs/inch.

8. A training model for endoscopic vein harvesting, comprising:
    an insert including a tray having a first end and a second end and a slit at a location between the first end and the second end; and
    a base, the base configured to cause the first end and the second end to rotate with respect to the slit when the tray contacts the base.

9. The training model of claim 8, wherein the insert comprises a tissue material disposed within the tray and a vein casting disposed within the tissue material.

10. The training model of claim 9, wherein the vein casting is disposed within the tissue material such that a pull-out force between the tissue material and the vein casting ranges from 0.05 to 0.50 lbs/inch.

11. The training model of claim 10, wherein the pull-out force between the tissue material and the vein casting ranges from 0.10 to 0.20 lbs/inch.

* * * * *